United States Patent Office 3,454,553
Patented July 8, 1969

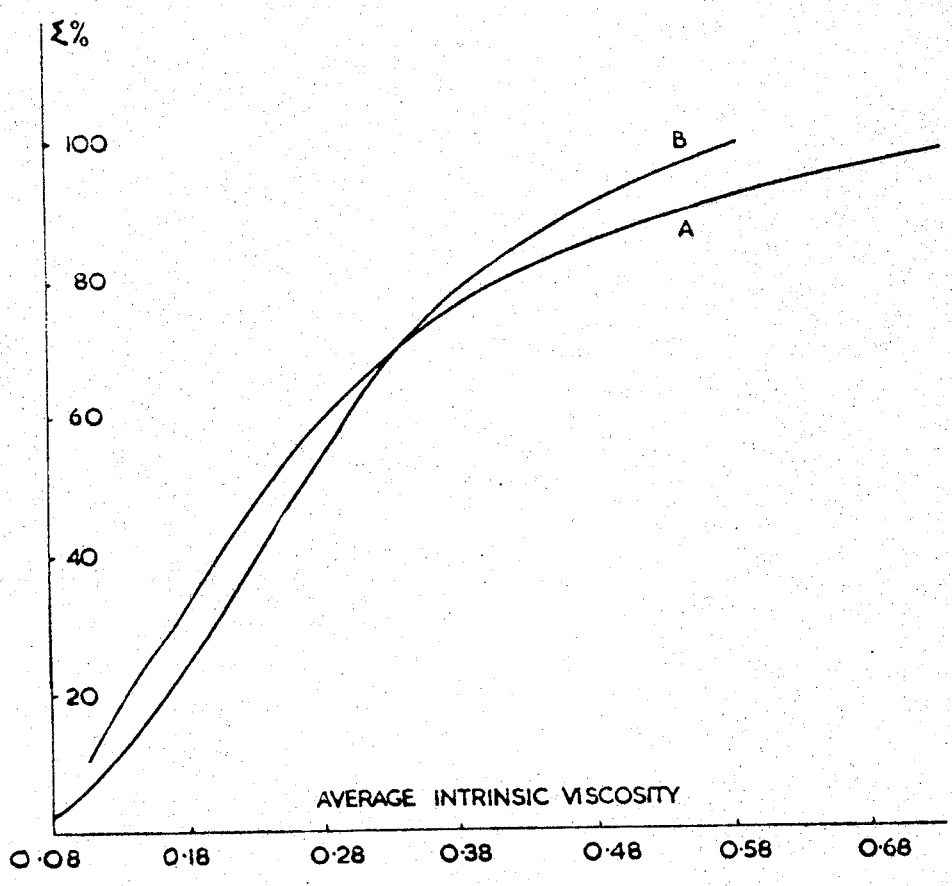

3,454,553
PROCESS FOR THE PARTIAL DEPOLYMERIZATION OF DEXTRANS
Ranulph Michael Alsop, Alderley Edge, England, assignor to Fisons Pharmaceuticals Limited, Loughborough, England
Filed Dec. 5, 1966, Ser. No. 599,333
Int. Cl. C08b 19/08
U.S. Cl. 260—209                                          11 Claims

ABSTRACT OF THE DISCLOSURE

A process for the partial depolymerization of native and other high molecular weight dextrans to give a product having a relatively narrow dispersion of lower molecular weight dextrans wherein the dextran is subject to a series of hydrolysis steps which alternate with a series of solvent extraction steps, each of said solvent extraction steps comprising contacting the partial hydrolysis reaction mixture from one of the hydrolysis steps with a solvent which when added to an aqueous dextran solution brings about separation of the dextran solution into two phases, forming the dextran/solvent mixture into two layers and recovering dextran in the desired molecular weight range from the upper layer and each of said hydrolysis steps comprising hydrolyzing the high molecular weight material in the lower layer of a solvent extraction step.

---

The present invention relates to the partial hydrolysis of native or other dextrans to give a product having a relatively narrow dispersion of lower molecular weight material.

The native dextran produced according to known methods by growing under carefully controlled conditions appropriate organisms, especially Leonconostoc mesenteroides in a suitable nutrient medium containing sucrose has a mean molecular weight reported as high as 40 million and is poly-disperse—that is the solution of the material contains molecules both larger and smaller than a mean figure. In order for it to be used as a blood plasma expander the molecular weight of the dextran first needs to be reduced by hydrolysis and then a "narrow" range of molecular sizes isolated by fractionation.

Hydrolysis of a dextran involves the splitting of glycosidic linkages between pairs of anhydroglucose units with the addition of the elements of water across the linkage. Hydrolysis may be effected, for example, with acids or alkalis, ion-exchange resins, ultrasonic vibrations or enzymes.

For clinical purposes the "narrowness" of the molecular weight distribution is sometimes stated in terms of molecular weight, at others in terms of average intrinsic viscosity (over the molecular weight range 0–500,000 relationships have been published between molecular weight and average intrinsic viscosity—for example average intrinsic viscosity equals $0.85 \times 10^{-3} \, M^{0.5}$ where M is weight average molecular weight). For example the British Pharmacopaeia specifications for clinical dextran injections limits the distribution by setting the average intrinsic viscosity of the whole fraction and then limiting the average intrinsic viscosity of the largest molecules in the sample. The quantity of small molecules is set by a urine exretion test. On the other hand the Canadian and American specifications limit the distribution by specifying the molecular size of the whole fraction and of the 5–10% fraction containing the largest molecules together with the 5–10% fraction containing the smallest molecules.

Although hydrolysis of native dextran gradually reduces the average intrinsic viscosity or mean molecular weight, the resulting hydrolysate is a broad fraction containing appreciable quantities of both small and high molecular weight dextran molecules which do not fall within the desired clinical range even though the mean molecular weight may be the same as that of this desired clinical range.

By carefully controlling the rate of hydrolysis, it is possible to stop the reaction when the maximum weight of desired molecules are present in the hydrolysate—in the case of the British Pharmacopaeia Dextran 150 injection between 50,000 and 300,000 molecular weight corresponding to average intrinsic viscosity of 0.19 to 0.47. Most of these desired molecules can then be isolated by fractionation procedures, and presented in solution in isotonic saline for use as a blood volume expander. Between 25 and 50% of the dextrans present in the hydrolysate are of useful size as a clinical fraction the yield varying with the "tightness" of the clinical specification required.

This yield can be increased by re-hydrolysing the rejected high molecular weight material isolated from the fractionation procedure followed by subsequent fractionation of the hydrolysate, but this is rarely done commercially.

The present invention provides a method of hydrolysis which improves the "shape" of the hydrolysate distribution curve and which now contains a much greater percentage weight of molecules in the desired size range. This is obtained by removing from the hydrolysis, as soon as possible after they are formed, those molecules which have been reduced in size to the desired range, thus preventing them from being further hydrolysed to unwanted lower molecular weight molecules.

In the hydrolysis process according to the present invention separation of the molecules within or below the desired size range is effected by making use of the differential solubility of low and high molecular weight dextran fractions in certain solvents. If methanol, ethanol, isopropanol, acetone or similar solvent be added to an aqueous dextran solution a point is reached where two phases are produced. Both phases contain dextran, water and solvent, but the lower (syrup) phase contains the higher molecular weight dextran and the upper phase (supernatant) contains the lower molecular weight dextrans.

Accordingly the present invention is for a process for the partial depolymerisation of native or other high molecular weight dextrans to give a product having a relatively narrow dispersion of lower molecular weight dextrans wherein the dextran is subject to a series of hydrolysis steps which alternate with a series of solvent extraction steps, each of solvent extraction steps comprising contacting the partially hydrolysed dextran from one of the hydrolysis steps with a solvent of the type defined herein, forming the dextran/solvent mixture into two layers, and recovering dextran in the desired molecular weight range from the upper layer, and each of said hydrolysis steps comprising hydrolysing the lower layer of a solvent extraction step containing high molecular weight material.

Any solvent may be employed in the process of the present invention which fulfills the condition that when added to an aqueous solution of dextran it caused the solution to form two phases, one phase containing substantially the relatively high molecular weight dextran molecules and the other containing substantially the relatively low molecular weight molecules. Examples of such solvents include alcohols such as methanol, ethanol, isopropanol or mixtures of these ketones such as acetone and the like.

The concentration of the solvent governs the distribution of dextran between the two phases. As the solvent concentration is increased in an aqueous dextran hydrolysate increasing amounts of dextran are precipitated in the lower or syrup phase. The solvent concentration may therefore be adjusted so that the supernatant phase contains dextran molecules of a size below a desired threshold; the syrup phase contains all the molecules greater than this size together with some occluded lower molecular weight material.

The hydrolysis step may be carried out by a process which comprises treating the lower or syrup phase with acid preferably at a temperature of between 40–120° C. to partially hydrolyse the dextran and neutralising the acid with alkali, further solvent being added during this step to maintain the initial solvent concentration. The solvent may be added along with the acid or the alkali or with both or may be added in a separate step. The hydrolysed syrup is then re-equilibrated with the supernatant and the dextran molecules which have been hydrolysed below the threshold set by the solvent concentration are extracted into the supernatant.

However it is preferred to perform the hydrolysis making use of the fact that at lower temperatures the acid hydrolysis of dextran proceeds at a negligible rate but increases rapidly with temperature. For example, under standard conditions of acidity, the hydrolysis rate at 30° C. is more than 100 times slower than at 60° C. Accordingly a preferred embodiment of the present invention is for a process for the partial depolymerisation of native or other high molecular weight dextrans to give a product having a relatively narrow dispersion of lower molecular weight dextrans wherein the dextran is subject to a series of hydrolysis steps which alternate with a series of solvent extraction steps, each of said solvent extraction steps comprising contacting an acidic solution of the partially hydrolysed dextran from one of the hydrolysis steps with a solvent of the type defined herein at a temperature at which the dextran is not hydrolysed to an appreciable extent, forming the dextran/solvent mixture into two layers and recovering dextran in the desired molecular weight range from the upper layer, and each of said hydrolysis steps comprising raising the temperature of the acidic material from the lower layer to a point at which hydrolysis takes place to an appreciable extent.

In the case of acid hydrolysis any mineral acid may be employed in the hydrolysis step of the present invention but it is preferred to use hydrochloric acid. Suitably the concentration of the acid is in the range 0.001 N to 5 N. It will be understood that the concentration of the acid influences the temperature at which hydrolysis takes place but subject to this condition the temperature at which the hydrolysis step is conducted may be in the range 40 to 120° C. The effect of temperature on hydrolysis rate is illustrated by the fact that when the concentration of acid is 0.3 N a dextran of average intrinsic viscosity 0.50 is reduced to average intrinsic viscosity 0.30 in 20 minutes at 75° C., but at 25° C. the same degree of hydrolysis takes 20,000 minutes.

The supernatant layer may be separated from the lower syrup layer by decantation or centrifugation.

The process of the present invention may be conducted as a batch operation or as a continuous operation. In the batch operation the lower or syrup layer is recycled between the hydrolysis and solvent extraction steps until no lower layer is present. In the continuous operation an aqueous native dextran solution, acid and solvent are introduced to produce a two phase system at a desired solvent strength. The lower syrup layer is continuously removed, heated for hydrolysis, cooled and returned to the upper solvent layer.

The solvent extraction step takes place whilst the syrup settles through the upper layer to accumulate as further syrup phase for hydrolysis.

The process of the present invention produces a dextran hydrolysate having a narrow range or dispersion of molecular weights as compared with a conventionally produced dextran hydrolysate. This is illustrated in the following example.

Example 507 grams of dextran isolated from fermentation by a preliminary acid hydrolysis treatment followed by solvent precipitation and having an average intrinsic viscosity of 0.50 corresponding to weight average molecular weight of 350,000 were dissolved in 4670 grams of water. 2400 grams of ethanol and 215 grams of concentrated hydrochloric acid were added with stirring and the mixture allowed to settle at 25° C. The settled syrup phase was removed, heated to 75° C. rapidly with stirring under a reflux condenser to prevent loss of alcohol and maintained at this temperature for three minutes. The syrup was cooled rapidly to 25° C. and added to the original supernatant with vigorous stirring in order to achieve equilibration. After settling for half an hour the syrup phase was again removed, heated to 75° C. for three minutes as before and returned to the supernatant. After ten such treatments the syrup had all dissolved in the supernatant. The solution was neutralised with 5 N sodium hydroxide and filtered. From this filtered hydrolysate it was possible to isolate by conventional fractionation procedures 60% of the dextrans falling within a given clinical specification (mean molecular weight 50,000–160,000. Top 5–10%, less than 350,000. Lower 5–10% greater than 25,000). From a hydrolysate of identical mean average molecular weight produced by conventional acid hydrolysis in aqueous solution of the same starting dextrans it was possible to isolate only 30% of the same clinical dextran fraction.

Analyses of the total hydrolysed dextrans by a stepwise fractionation procedure which can be interpreted to show the distribution of the various molecular sizes present has shown that hydrolysed dextrans produced by the new method are about twice as rich in a given middle molecular weight range as those produced by conventional means.

The accompanying graph represents the distribution curves obtained on hydrolysing native dextran according to conventional methods (curve A) and according to the process of the present invention (curve B). In both cases the average intrinsic viscosity was 0.295 but in the case of the conventional process only 48% of the hydrolysate had a viscosity in the range 0.19 to 0.47 while using the present process 63% had a viscosity in the range 0.19 to 0.47.

I claim:

1. A process for the partial depolymerization of native and other high molecular weight dextrans to give a product having a relatively narrow dispersion of lower molecular weight dextrans wherein the dextran is subject to a series of hydrolysis steps which alternate with a series of solvent extraction steps, each of said solvent extraction steps comprising contacting the partial hydrolysis reaction mixture from one of the hydrolysis steps with a solvent which when added to an aqueous dextran solution brings about separation of the dextran solution into two phases, forming the dextran/solvent mixture into two layers and recovering dextran in the desired molecular weight range from the upper layer and each of said hydrolysis steps comprising hydrolyzing the high molecular weight material in the lower layer of a solvent extraction step.

2. A process as claimed in claim 1 wherein each of said hydrolysis steps comprises treating the lower layer of the solvent extraction step with an acid and thereafter neutralising the acid with an alkali.

3. A process for the partial depolymerization of native and other high molecular weight dextrans to give a product having a relatively narrow dispersion of lower molecular weight dertrans wherein the dextran is subject to a series of hydrolysis steps which alternate with a series of solvent extraction steps, each of said solvent extraction steps comprising contacting an acidic solution of the partially hydrolyzed dextran from one of the hydrolysis steps with a solvent which when added to an aqueous solution brings about separation of the dextran solution into two phases, at a temperature at which the dextran is not hydrolyzed to an appreciable extent, forming the dextran/solvent mixture into two layers and recovering dextran in the desired molecular weight range from the upper layer and each of said hydrolysis steps comprising raising the temperature of the acidic material from the lower layer to a point at which hydrolysis takes place to an appreciable extent.

4. A process as claimed in claim 3 wherein the acid is hydrochloric acid.

5. A process as claimed in claim 3 wherein the acid has a concentration in the range of 0.001 N to 5 N.

6. A process as claimed in claim 3 wherein the temperature at which the hydrolysis is performed is in the range of 40° C. to 120° C.

7. A process as claimed in claim 3 wherein the solvent is a lower alcohol.

8. A process as claimed in claim 3 wherein the solvent is alcohol selected from the group consisting of methanol, ethanol, isopropanol and mixtures of these.

9. A process as claimed in claim 3 wherein the solvent is a lower ketone.

10. A process as claimed in claim 3 wherein the solvent is acetone.

11. A process according to claim 1 in which the hydrolysis is carried out in the presence of the solvent used in a preceding fractionation step.

References Cited

UNITED STATES PATENTS

| | | |
|---|---|---|
| 2,437,518 | 3/1948 | Gronwall et al. |
| 2,565,507 | 8/1951 | Lockwood et al. |
| 2,644,815 | 7/1953 | Gronwall et al. |
| 2,686,778 | 8/1954 | Wimmer. |
| 2,727,838 | 12/1955 | Dalton. |
| 2,820,740 | 1/1958 | London et al. |

LEWIS GOTTS, *Primary Examiner.*

J. R. BROWN, *Assistant Examiner.*